US012606101B2

(12) United States Patent
Yamanaka et al.

(10) Patent No.: US 12,606,101 B2
(45) Date of Patent: Apr. 21, 2026

(54) CONTROL APPARATUS

(71) Applicant: HOSIDEN CORPORATION, Osaka (JP)

(72) Inventors: Yoshifumi Yamanaka, Osaka (JP); Shingo Okano, Osaka (JP); Tomoki Umeda, Osaka (JP); Kouta Onoyama, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 528 days.

(21) Appl. No.: 17/625,229

(22) PCT Filed: Jul. 9, 2019

(86) PCT No.: PCT/JP2019/027093
§ 371 (c)(1),
(2) Date: Jan. 6, 2022

(87) PCT Pub. No.: WO2021/005699
PCT Pub. Date: Jan. 14, 2021

(65) Prior Publication Data
US 2022/0266773 A1 Aug. 25, 2022

(51) Int. Cl.
B60R 11/02 (2006.01)
G06F 13/42 (2006.01)
H04R 3/12 (2006.01)
(52) U.S. Cl.
CPC .......... B60R 11/02 (2013.01); G06F 13/4247 (2013.01); H04R 3/12 (2013.01)
(58) Field of Classification Search
None
See application file for complete search history.

(56) References Cited

U.S. PATENT DOCUMENTS 5,754,436 A * 5/1998 Walsh ................. G06F 9/30083
700/286
7,721,068 B2 * 5/2010 Lowe ................. G06F 12/1081
710/36
(Continued)

FOREIGN PATENT DOCUMENTS

CN 105531157 A 4/2016
EP 3048536 A1 7/2016
(Continued)

OTHER PUBLICATIONS

WIPO # 2020089584, International Publication Date: May 7, 2020, 35 pages.*

(Continued)

*Primary Examiner* — Henry Tsai
*Assistant Examiner* — Christopher A Bartels
(74) *Attorney, Agent, or Firm* — Dilworth & Barrese, LLP.; Michael J. Musella, Esq.

(57) ABSTRACT

A control apparatus that bidirectionally communicates with a control unit based on a preset time-sharing method includes: a plurality of devices each installed on a different substrate; a communication controller daisy-chained to the control unit via a bus line through which bidirectional communication of communication data is performed, the communication data having a data structure having a band in which data to be communicated between the plurality of devices is superimposable; and a cable configured to connect at least one device of the plurality of devices to the communication controller.

9 Claims, 3 Drawing Sheets

(56)           References Cited

U.S. PATENT DOCUMENTS

| | | | |
|---|---|---|---|
| 9,412,273 B2* | 8/2016 | Ricci | B60R 25/00 |
| 9,742,603 B1* | 8/2017 | Bandi | H04L 7/0091 |
| 10,162,793 B1* | 12/2018 | Bshara | H04L 69/16 |
| 10,673,439 B1* | 6/2020 | Ahmad | H03K 19/17736 |
| 11,063,594 B1* | 7/2021 | Ahmad | H03K 19/1776 |
| 11,114,112 B2* | 9/2021 | Poulsen | G10L 21/055 |
| 11,232,060 B2* | 1/2022 | Srivastava | G06F 13/4282 |
| 2005/0078683 A1* | 4/2005 | Page | H04L 1/0061 370/395.5 |
| 2006/0158268 A1* | 7/2006 | McCorquodale | H03B 5/06 331/34 |
| 2008/0005495 A1* | 1/2008 | Lowe | G06F 12/1081 711/E12.067 |
| 2010/0329247 A1* | 12/2010 | Kennedy | H04L 25/49 375/259 |
| 2013/0124763 A1* | 5/2013 | Kessler | G06F 11/0754 710/110 |
| 2014/0101477 A1* | 4/2014 | Patterson | G06F 1/263 713/340 |
| 2014/0269972 A1* | 9/2014 | Rada | H04L 27/106 375/285 |
| 2014/0345251 A1* | 11/2014 | McLean | F03H 99/00 60/202 |
| 2015/0126249 A1 | 5/2015 | Muraoka et al. | |
| 2015/0142241 A1* | 5/2015 | Song | B62M 6/50 701/22 |
| 2015/0179269 A1* | 6/2015 | Lee | G11C 16/3459 365/185.03 |
| 2015/0301968 A1* | 10/2015 | Kessler | G06F 11/0754 710/110 |
| 2015/0344156 A1* | 12/2015 | Vail, III | G01R 31/008 701/32.8 |
| 2016/0224499 A1 | 8/2016 | Shibata et al. | |
| 2016/0287166 A1* | 10/2016 | Tran | A61B 5/74 |
| 2017/0220502 A1 | 8/2017 | Kessler et al. | |
| 2017/0222790 A1* | 8/2017 | Hooper | H04H 60/00 |
| 2017/0222829 A1 | 8/2017 | Kessler et al. | |
| 2018/0213669 A1* | 7/2018 | Kochukunju | G06F 9/45558 |
| 2018/0365188 A1* | 12/2018 | Srivastava | G06F 13/4045 |
| 2019/0306134 A1* | 10/2019 | Shanbhogue | H04L 63/123 |
| 2019/0385057 A1* | 12/2019 | Litichever | H04L 63/14 |
| 2019/0391936 A1* | 12/2019 | Stalley | H04L 67/568 |
| 2020/0006988 A1* | 1/2020 | Leabman | A61B 8/56 |
| 2020/0021633 A1* | 1/2020 | Sengoku | G06F 13/4291 |
| 2020/0294401 A1* | 9/2020 | Kerecsen | G08G 1/205 |
| 2021/0041982 A1* | 2/2021 | Hong | G06F 3/0447 |
| 2021/0111654 A1* | 4/2021 | Ishitani | G06F 3/016 |
| 2021/0113130 A1* | 4/2021 | Tran | A61B 5/14532 |
| 2021/0124711 A1* | 4/2021 | Ansari | G06F 11/0772 |
| 2021/0191897 A1* | 6/2021 | Cicerone | H04L 12/403 |
| 2021/0364627 A1* | 11/2021 | Cai | G01S 19/35 |
| 2022/0045554 A1* | 2/2022 | Leabman | H02J 50/80 |
| 2022/0046114 A1* | 2/2022 | Entelis | H04L 12/40 |
| 2022/0101042 A1* | 3/2022 | Kaminitz | G06N 3/048 |
| 2022/0103186 A1* | 3/2022 | Kaminitz | H03M 13/15 |
| 2022/0164303 A1* | 5/2022 | Raghav | G06F 12/0871 |
| 2022/0206958 A1* | 6/2022 | LeMay | G06F 12/0831 |
| 2022/0358079 A1* | 11/2022 | Mishra | G06F 1/08 |
| 2022/0391341 A1* | 12/2022 | Rosenbaum | G06F 13/4221 |
| 2023/0143642 A1* | 5/2023 | Takahashi | H04L 47/2475 370/230 |
| 2023/0164123 A1* | 5/2023 | Miyamoto | H04L 63/0428 713/168 |
| 2023/0370311 A1* | 11/2023 | Kessler | H04L 27/0008 |
| 2023/0421545 A1* | 12/2023 | Shanbhogue | H04L 63/0457 |

FOREIGN PATENT DOCUMENTS

| | | | |
|---|---|---|---|
| JP | 2007-302155 A | 11/2007 |
| JP | 2009-195021 A | 8/2009 |
| JP | 2010-282773 A | 12/2010 |
| JP | 2014-45016 A | 3/2014 |
| JP | 2015-91043 | 5/2015 |
| JP | 2017-85621 A | 5/2017 |
| JP | 2017-135710 A | 8/2017 |

OTHER PUBLICATIONS

Japanese Office Action issued on Jun. 6, 2023 in corresponding Japanese Application No. 2021-530387.
Office Action issued Jul. 26, 2023 in Chinese appln. No. 201980098281.
Office Action issued Jan. 4, 2023 in Japanese Application No. 2021-530387.
Search Report issued Mar. 23, 2023 in EP19936988.5.

* cited by examiner

FIRST BAND

FIRST
TRANSMISSION
DATA

SECOND
BAND

FIRST BAND

SECOND
TRANSMISSION
DATA

SECOND
BAND

FIRST BAND

FIRST
RECEIVING
DATA

SECOND
BAND

FIRST BAND

SECOND
RECEIVING
DATA

SECOND
BAND

CONTROL APPARATUS

TECHNICAL FIELD

The present invention relates to a control unit that bidirectionally communicates with a control unit based on a preset time-sharing method.

BACKGROUND ART

Conventionally, control apparatuses that control and drive a plurality of elements with one control unit have been used. One technique that employs such a configuration is described in Patent Document 1, for example.

Patent Document 1 discloses a microphone device that outputs sound detected by a plurality of microphones. This onboard microphone device has a microphone array that includes a plurality of microphone elements having different directivity directions. The microphone array is provided in a map light unit at the top of the front of the vehicle interior. Each of the plurality of microphone elements is installed so as to have unidirectivity with maximum detection sensitivity in the frontal direction.

PRIOR ART DOCUMENTS

Patent Documents

Patent Document 1: JP 2007-302155A

DISCLOSURE OF THE INVENTION

Problem to be Solved by the Invention

In the technique described in Patent Document 1, the plurality of microphones are configured as a single microphone array. This configuration increases the size of a substrate that constitutes the microphone array, resulting in a larger device. Moreover, each of the microphone elements can only be installed at a fixed position on the substrate. Therefore, it cannot be said that the performance of the device can always be effectively utilized. The degree of freedom of installation in terms of arrangement may also decrease.

In view of this, there is a need for a control apparatus that can be compactly configured.

Means for Solving Problem

A characteristic configuration of a control apparatus according to the present invention lies in a control apparatus that bidirectionally communicates with a control unit based on a preset time-sharing method, the apparatus including: a plurality of devices each installed on a different substrate; a communication controller daisy-chained to the control unit via a bus line through which bidirectional communication of communication data is performed, the communication data having a data structure having a band in which data to be communicated between the plurality of devices is superimposable; and a cable configured to connect at least one device of the plurality of devices to the communication controller.

This characteristic configuration makes it possible to divide a substrate on which the plurality of devices are installed and achieve a reduction in size. The smaller size also allows for greater flexibility in arrangement. Furthermore, each device can be arranged based on the usage and detection direction. It is, therefore, not necessary to use highly sensitive devices, and inexpensive devices can be used. Therefore, the control apparatus can be realized at low cost.

It is preferable that the communication controller is installed on the same substrate as a device of the plurality of devices that is other than the at least one device connected by the cable.

This configuration allows the communication controller and one of the devices (the "device . . . that is other than the device connected by the cable") to be configured on the same substrate. Thus, the number of cables used can be reduced.

It is preferable that the communication controller is installed on a different substrate from each of the plurality of devices.

This configuration allows the communication controller and the plurality of devices to be installed on separate substrates, thus making it possible to reduce the size of each substrate. Therefore, it is possible to further increase the degree of freedom of arrangement.

It is preferable that the cable has a first power line to which a first potential is applied, a second power line to which a second potential lower than the first potential is applied, a signal line, and a control line, and the second power line is arranged to cover a periphery of a line group including the first power line, the signal line, and the control line.

This configuration can reduce electromagnetic waves going from the cable to the outside, and can also reduce electromagnetic waves going from the outside to the cable. Thus, malfunction of the devices due to electromagnetic waves passing through the cable can be prevented.

It is preferable that an element that suppresses an influence of electromagnetic waves is installed on substrates on which the devices are installed.

This configuration can reduce the influence of electromagnetic waves on the substrates on which the devices are installed. Thus, malfunction of the devices due to such electromagnetic waves can be prevented.

It is preferable that the plurality of devices are acoustic devices.

This configuration can increase the degree of freedom in the arrangement of the acoustic devices, and the plurality of acoustic devices can be arranged at low cost.

It is preferable that the bus line is an automotive audio bus, and each of the plurality of devices is provided in a vehicle.

This configuration allows the communication controller to transmit and receive the communication data to and from the control unit via the automotive audio bus. This communication data can be transmitted to the plurality of devices provided at respective parts of the vehicle. In addition, the communication data received by the communication controller from the plurality of devices provided in the respective parts of the vehicle can also be transmitted to the control unit via the automotive audio bus.

It is preferable that the plurality of devices are each provided in correspondence with a seat of the vehicle.

This configuration allows the devices to be arranged while being allocated to each passenger sitting in a vehicle seat. Accordingly, improved convenience can be achieved in automotive applications.

BEST MODE FOR CARRYING OUT THE INVENTION

A control apparatus according to the present invention is compact, and bidirectionally communicates with a control unit, which is a host system, based on a preset time-sharing method. Hereinafter, a control apparatus 1 of the present embodiment will be described.

Figure 1:
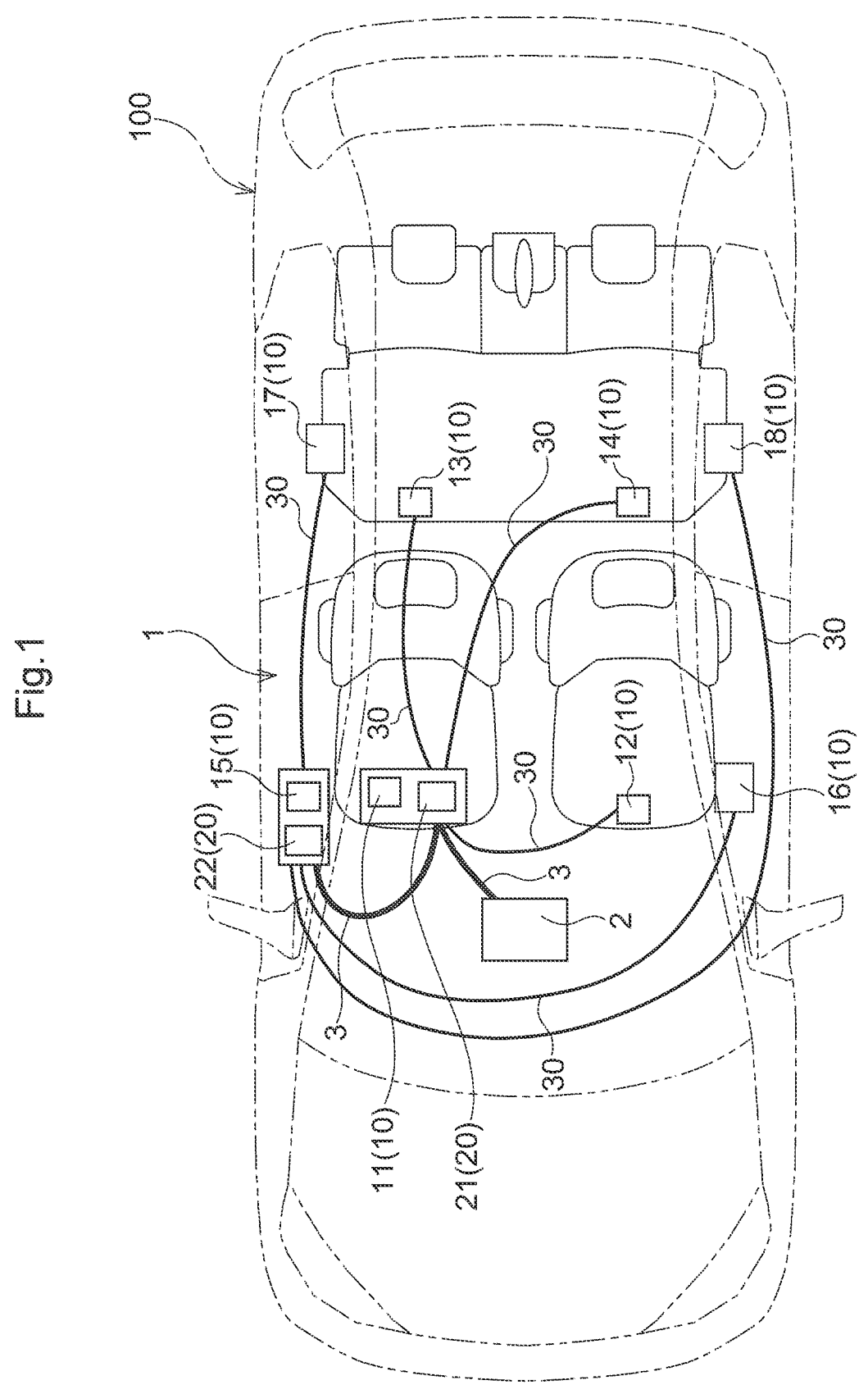
FIG. 1 shows an example of installing a control unit and a control apparatus in a vehicle.
Figure 2:
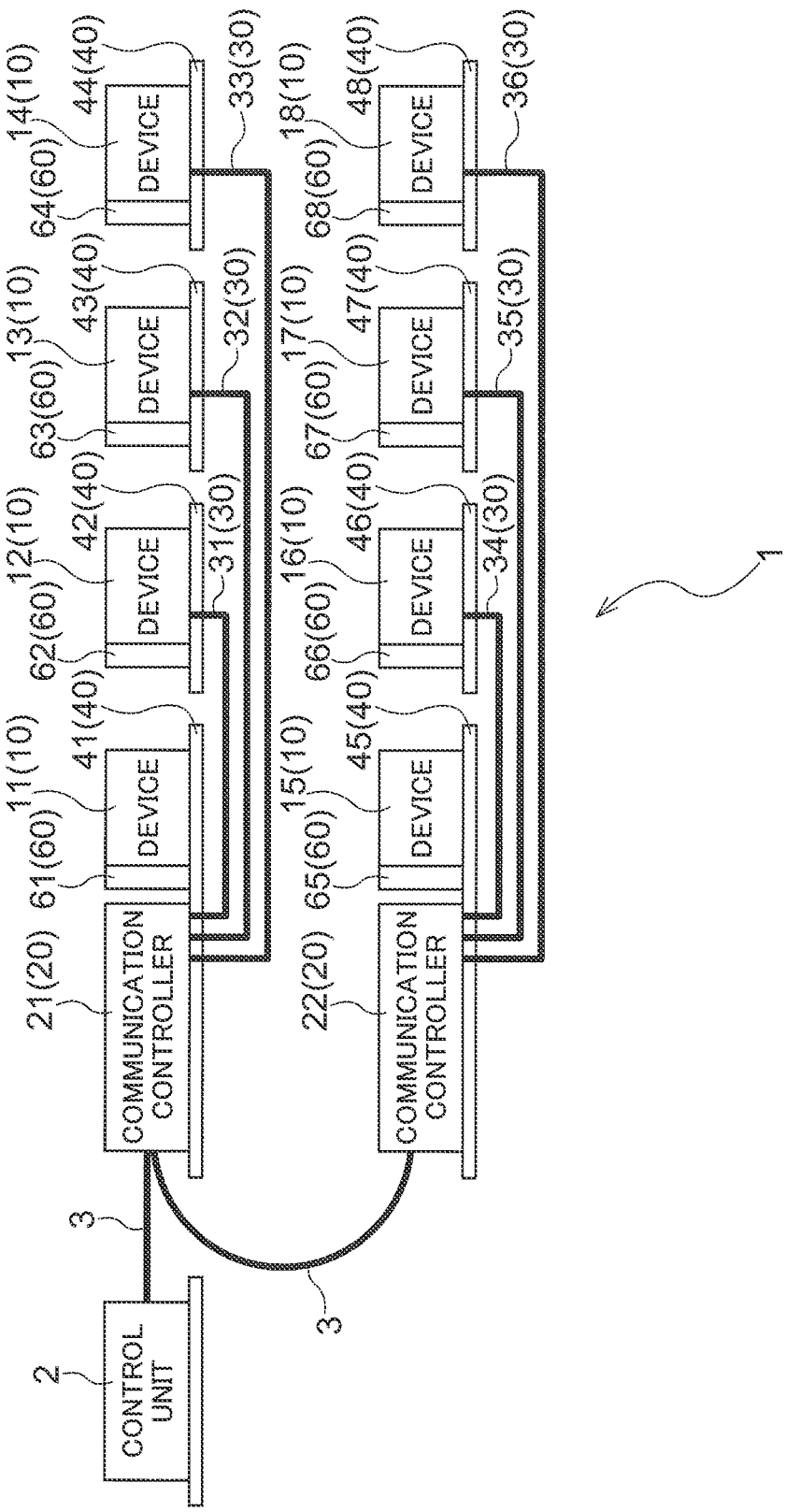
FIG. 2 is a schematic diagram showing a configuration of the control apparatus.

FIG. 1 shows an example of the control apparatus 1 installed in a vehicle 100. FIG. 2 shows a block diagram showing a configuration of the control apparatus 1. As shown in FIGS. 1 and 2, the control apparatus 1 includes devices 10, communication controllers 20, and cables 30.

In this embodiment, the devices 10 include eight devices 11 to 18, as described in detail later. In the following, the devices will be collectively referred to as the devices 10, and will be described with their respective reference signs when described separately. The communication controllers 20 include two communication controllers 21 and 22. In the following, the communication controllers will be collectively referred to as the communication controllers 20, and will be described with their respective reference signs when described separately.

The communication controllers 20 are daisy-chained to a control unit 2, which is a host system, via bus lines 3. "Being daisy-chained" refers to a method of connecting devices such as electrical devices by means of cables. Here, one control unit 2 and a plurality of communication controllers 20 are connected in series to each other in a linked manner. Accordingly, when viewed from the control unit 2 that is the source of the output of signals connected in a daisy-chain, the downstream communication controller 22 is relayed to the upstream communication controller 21 for the transmission of communication data (data, signals etc.). There are various standards for such daisy-chain connections, but these are known and are therefore not described here. In this embodiment, the control unit 2 is daisy-chained to the plurality of communication controllers 21 and 22 by the bus lines 3.

Bidirectional communication of communication data is performed between the control unit 2 and the plurality of communication controllers 20 via the bus lines 3. Each bus line 3 includes a twisted pair cable. Bidirectional communication is performed using this twisted pair cable by means of LVDS (small amplitude differential signaling), for example. The bus lines 3 are laid out in the vehicle 100 as shown in FIG. 1. Thus, the control unit 2 and each of the plurality of communication controllers 20 provided in respective parts of the vehicle 100 can transmit and receive communication data to and from each other.

Figures 3, 4:
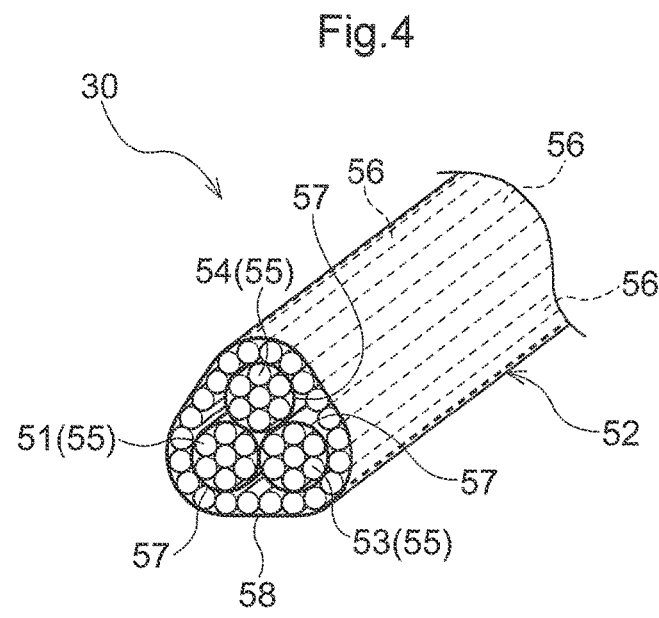
FIG. 3 shows a data structure of communication data that is bidirectionally communicated via a bus line.
FIG. 4 shows a configuration of a cable.

Here, FIG. 3 shows an example of the communication data in bidirectional communication between the control unit 2 and the plurality of communication controllers 20. Here, for ease of understanding, the communication data transmitted from the control unit 2 to the communication controller 21 is referred to as first transmission data, the communication data transmitted from the control unit 2 to the communication controller 22 is referred to as second transmission data, the communication data transmitted from the communication controller 21 to the control unit 2 is referred to as first receiving data, and the communication data transmitted from the communication controller 22 to the control unit 2 is referred to as second receiving data. These data are communicated based on a preset time-sharing method. That is, the data are communicated in a temporal sequence as shown in FIG. 3. Although the communication data are transmitted and received based on the time-sharing method, a delay in transmitting and receiving each data can be ignored by setting the period of each data to, for example, a few tens of microseconds.

Each of these data has a data structure having a first band and a second band, for example. The first band is a band in which data to be communicated between the plurality of devices 10 is superimposable, and that enables data to be transmitted and received via the bus lines 3 between the communication controllers 20 installed in the vehicle 100. For example, if the plurality of devices 10 are acoustic devices, that is, if the plurality of devices 10 include, for example, a player that reproduces sound, a speaker that outputs sound, a microphone that collects sound, and so on, the devices are configured so that sound signals can be transmitted between them. Needless to say, the plurality of devices 10 may also include devices such as an acceleration sensor. The devices are configured so that sound signals can also be transmitted between them via the bus lines 3.

For example, when sound data is transmitted and received using the bus lines 3 between a player and a speaker or between a microphone and a speaker, communication data can be configured so that the second band contains data indicating identification information with which the destination communication controller 20 can be identified, and the first band contains sound data to be used by the destination device.

Such bus lines 3 can be automotive audio buses. The automotive audio buses are installed in the vehicle 100 and are used to transmit data and signals. In this control apparatus 1, the communication controllers 20 transmit communication data to the control unit 2 using such automotive audio buses. Specifically, the bus lines 3 can be $A^2B$ (registered trademark). This configuration makes it possible to reduce the weight and cost of the bus lines 3.

In this embodiment, the devices 11 to 14 correspond to microphones, and the devices 15 to 18 correspond to speakers. The devices 11 to 14 can include not only microphones but also circuits that drive the microphones (microphone circuits). The devices 15 to 18 can include not only the speakers but also circuits that drive the speakers (speaker circuits).

As shown in FIG. 1, the plurality of devices 10 are installed in the vehicle 100. The device 11 collects sound generated by a driver sitting in a driver's seat, and the device 12 collects sound generated by a passenger sitting in a passenger's seat. The devices 11 and 12 may be located at positions that oppose the driver and the passenger in the passenger's seat, respectively and do not obstruct their view (e.g., on the ceiling of the front part). The device 13 collects sound generated by a passenger sitting behind the driver's seat, and the device 14 collects sound generated by a passenger sitting behind the passenger's seat. The devices 13 and 14 may be located at positions that oppose these passengers and do not obstruct their view (e.g., on a ceiling portion in front of their respective seats, side pillars etc.).

Furthermore, the devices 15 to 18 output sound to the driver and the passengers sitting in the driver's seat, the passenger's seat, and the rear left and right seats, respectively. The devices 15 to 18 can each be provided on a side of the corresponding seat. Thus, in this embodiment, the plurality of devices 10 are provided in correspondence with the seats of the vehicle 100.

As shown in FIG. 2, the plurality of devices 10 are installed on different substrates 40 (e.g., printed board). In this embodiment, the device 11 is installed on a substrate 41, the device 12 is installed on a substrate 42, the device 13 is installed on a substrate 43, and the device 14 is installed on a substrate 44. The device 15 is installed on a substrate 45, the device 16 is installed on a substrate 46, the device 17 is installed on a substrate 47, and the device 18 is installed on a substrate 48.

At least one of the plurality of devices 10 is connected to a communication controller 20 by the cable 30. In this embodiment, each communication controller 20 is installed on the same substrate 40 as a device 10, of the plurality of devices 10, other than the devices 10 connected by the cables 30. Specifically, the communication controller 21 and the device 11 are installed on the same the substrate 41, as shown in FIG. 2. Thus, power supply and the transmission and reception of data between the communication controller 21 and the device 11 are performed via a pattern formed on the substrate 41.

Meanwhile, the communication controller 21 and the devices 12, 13, and 14 are installed on different substrates 40. Thus, the communication controller 21 and the device 12 are connected by a cable 31, the communication controller 21 and the device 13 are connected by a cable 32, and the communication controller 21 and the device 14 are connected by a cable 33.

Similarly, the communication controller 22 and the device 15 are installed on the same substrate 45. Thus, power supply and the transmission and reception of data between the communication controller 22 and the device 15 are performed via a pattern formed on the substrate 45.

Meanwhile, the communication controller 22 and the devices 16, 17, and 18 are installed on different substrates 40. Thus, the communication controller 22 and the device 16 are connected by a cable 34, the communication controller 22 and the device 17 are connected by a cable 35, and the communication controller 22 and the device 18 are connected by a cable 36. It is preferable that these cables 31 to 36 are flexible. The routing of the cables 31 to 36 can be thus facilitated. It is also possible to set the length of the cables 31 to 36 as appropriate, according to the distances between the communication controllers 20 and the devices 10.

In this embodiment, elements 60 that suppress the influence of electromagnetic waves are installed on the substrates 40 on which the devices 10 are installed. Specifically, elements 61 to 68 are installed on the respective substrates 41 to 48. At least one of a bead, a varistor, a resistor, a capacitor, and a filter, for example, corresponds to each of these elements 60. Accordingly, a plurality of types of elements may be used to form a circuit having a function of suppressing the influence of electromagnetic waves and installed on each substrate 40. Needless to say, it is also possible to install other types of elements 60.

FIG. 4 is a cross-sectional view of a cable 30. Each cable 30 includes a first power line 51, a second power line 52, a signal line 53, and a control line 54. The first power line 51 is used to supply power to a corresponding device 10. For this reason, a predetermined first potential is applied. A second potential, which is lower than the first potential, is applied to the second power line 52. The second potential is, for example, the ground potential. Accordingly, power is supplied to the devices 10 via the first power line 51 and the second power line 52. The signal line 53 is used, for example, to transmit data, and the control line 54 is used, for example, to transmit clock signals. Needless to say, the use of these lines is only an example, and the lines can be used to transmit other signals or data. In this embodiment, the first power line 51, the signal line 53, and the control line 54 are each constituted by a stranded wire formed with a plurality of wires integrated, the outer periphery of which is covered by an insulating material 57, as shown in FIG. 4.

The second power line 52 is arranged to cover the periphery of a line group 55 constituted by the first power lines 51, the signal lines 53, and the control lines 54. That is, the three lines, namely the first power line 51, the signal line 53, and the control line 54, form one line group 55. The second power line 52 is arranged so that the outer periphery of this line group 55 is covered with a plurality of wires 56 constituting the second power line 52. In this embodiment, the wires 56 are arranged extending in the direction in which the first power line 51, the signal line 53, and the control line 54 extend. The second power line 52 is arranged to cover the perimeter of the line group 55. The outermost part of the second power line 52 (the outermost part of the second power line 52 in a state covering the line group 55) may be covered by an insulating material 58 to prevent short-circuiting with other parts.

It is preferable to arrange these cables 30 at a predetermined distance from the bus lines 3. This configuration can reduce interference of the data and signals transmitted to each other. The distance can also be set based on, for example, inductance components and reactance components of the cables 30 and the bus lines 3, or based on the frequency and amplitude of the signals and data transmitted via the cables 30 and the bus lines 3. Furthermore, the distance may be set so that capacitive coupling does not occur between the cables 30 and the bus lines 3. Whichever configuration is used, it is preferable to adopt a support portion or a support structure so that the cables 30 and the bus lines 3 are separated from each other by a predetermined distance.

The above configuration can divide a substrate on which the plurality of devices 10 are installed, rather than arranging the communication controllers 20 and the plurality of devices 10 on one substrate as in the conventional technique. Thus, the control apparatus 1 can be downsized. In addition, of the plurality of devices 10, the devices 10 that are not installed together with a communication controller 20 on a substrate 40 can be configured at lower cost since the communication controller 20 is not required. Furthermore, the degree of freedom of the arrangement of the devices 10 can be increased by using the flexible cables 30 to connect the substrates 40. Accordingly, when considering the positions at which the devices 10 are to be incorporated in the vehicle 100, there is a greater choice in terms of arrangement, which can lead to increased convenience for a user of the vehicle 100.

OTHER EMBODIMENTS

The above embodiment has described an example in which the number of devices 10 is eight, but the number of devices 10 need only be two or more.

Note that the number of devices 10 may also be one, and the control apparatus 1 may be constituted by one device 10, one communication controller 20, and one cable 30. In this case, the device 10 and the communication controller 20 may be installed on different substrates 40, and the device 10 and the communication controller 20 installed on the different substrates 40 may be connected by the cable 30.

Although the above embodiment has described an example in which the number of communication controllers 20 is two, the number of communication controllers 20 may alternatively be one, or may be three or more.

The above embodiment has described an example case in which four devices 10 are connected to a communication controller 20. However, three or less devices 10 may be connected to one communication controller 20, or five or more devices 10 may be connected.

The above embodiment has described that each communication controller 20 is installed on the same substrate 40 as a device 10, of the plurality of devices 10, other than the devices 10 connected by the cables 30. However, the communication controller 20 may be installed on different substrates 40 from the plurality of devices 10.

The above embodiment has described that each cable 30 includes the first power line 51, the second power line 52, the signal line 53, and the control line 54, but the configuration of the cable 30 may be other than the above-described one. That is, each cable 30 can be constituted by two types of lines, or by three types of lines. Further, each cable 30 can be constituted by five or more types of lines.

The above embodiment has described that the second power line 52 is in a state covering the periphery of the line group 55, which includes the first power line 51, the signal line 53, and the control line 54, and the wires 56 are arranged extending in the direction in which the first power line 51, the signal line 53, and the control line 54 extend. However, the wires 56 can alternatively be arranged covering the line group 55 in a twisted state with respect to the direction in which with the first power line 51, the signal line 53, and the control line 54 extend. The second power line 52 has been described as being constituted by the plurality of wires 56, but the second power line 52 can alternatively be constituted by, for example, a foil that is a thinly stretched conductor. In this case, the outer periphery of the first power line 51, the signal line 53, and the control line 54 can be covered by the foil. It is also possible to process a conductor into a mesh and cover the outer periphery of the first power line 51, the signal line 53, and the control line 54 with this conductor.

The above embodiment has described that the elements 60 that suppress the influence of electromagnetic waves are installed on the substrates 40 on which the devices 10 are installed. However, the elements 60 do not need to be installed on the substrates 40, and elements with other functions may alternatively be installed. It is also possible to further suppress the influence of electromagnetic waves by providing each cable 30 with a ferrite core serving as an element that suppresses the influence of electromagnetic waves.

The above embodiment has described that the plurality of devices 10 are acoustic devices, but the devices 10 may alternatively be different devices from acoustic device, e.g., acceleration sensors or obstacle sensors.

The above embodiment has described that the bus lines 3 are automotive audio buses, and the plurality of devices 10 are each provided in correspondence with a seat of the vehicle 100. However, the plurality of devices 10 can alternatively be provided without being in corresponding with the seats in the vehicle 100. The bus lines 3 can also be configured similarly to the cables 30. In other words, each bus line 3 can be configured so that the periphery of a line to which a power supply potential is applied (corresponding to the "first power line 51"), a signal line, a control line, and the like, is covered by a line to which a reference potential is applied (corresponding to the "second power line 52").

The above embodiment has described that the bus lines 3 are automotive audio buses, but the bus lines 3 may alternatively be cables of an automotive network.

The above embodiment has described that communication data has a structure having the first band and the second band, but communication data may alternatively have a data structure having a band other than the first band or the second band.

The above embodiment has described an example of applying the control apparatus 1 to the vehicle 100, but the control apparatus 1 can also be applied to devices other than the vehicle 100.

INDUSTRIAL APPLICABILITY

The present invention can be used in a communication control apparatus that bidirectionally communicates with a control unit based on a preset time-sharing method.

DESCRIPTION OF REFERENCE SIGNS

1: control apparatus
2: control unit
40: substrate
10: device
3: bus line
20: communication controller
30: cable
51: first power line
52: second power line
53: signal line
54: control line
55: line group
60: element
100: vehicle

The invention claimed is:

1. A control apparatus that bidirectionally communicates with a control unit based on a preset time-sharing method, the apparatus comprising:

a plurality of devices each installed on a different substrate, wherein a substrate is a printed circuit board;

a communication controller daisy-chained to the control unit via a bus line through which bidirectional communication of communication data is performed, the communication data having a data structure having a band in which data to be communicated between the plurality of devices is superimposable; and a cable configured to connect at least one device of the plurality of devices to the communication controller, wherein each of the communication data of the bidirectional communication has a data structure having a first band and a second band, the second band contains data indicating identification information with which a destination communication controller can be identified, and the first band contains data to be used by a destination device, the cable has a first power line to which a power supply voltage to be supplied to the plurality of devices is applied, a second power line to which a ground potential is applied, a signal line for use to transmit the data, and a control line for use to transmit a clock signal, the second power line is arranged to cover a periphery of a line group including the first power line, the signal line, and the control line, the communication controller is installed on the same substrate as a device of the plurality of devices that is other than the at least one device connected by the cable, and transmission and reception of data between the communication controller and the other device, the communication controller and the other device being installed on the same substrate, is performed via a pattern formed on the substrate.

2. The control apparatus according to claim 1, wherein the communication controller is installed on a different substrate from each of the plurality of devices.

3. The control apparatus according to claim 2, wherein an element that suppresses an influence of electromagnetic waves is installed on substrates on which the devices are installed.

4. The control apparatus according to claim 1, wherein an element that suppresses an influence of electromagnetic waves is installed on substrates on which the devices are installed.

5. The control apparatus according to claim 1, wherein the plurality of devices are acoustic devices.

6. The control apparatus according to claim 1, wherein the bus line is an automotive audio bus, and each of the plurality of devices is provided in a vehicle.

7. The control apparatus according to claim 1, wherein an element that suppresses an influence of electromagnetic waves is installed on substrates on which the devices are installed.

8. The control apparatus according to claim 1, wherein the plurality of devices are acoustic devices.

9. A control apparatus that bidirectionally communicates with a control unit based on a preset time-sharing method, the apparatus comprising:

a plurality of devices each installed on a different substrate, wherein a substrate is a printed circuit board;

a communication controller daisy-chained to the control unit via a bus line through which bidirectional communication of communication data is performed, the communication data having a data structure having a band in which data to be communicated between the plurality of devices is superimposable; and a cable configured to connect at least one device of the plurality of devices to the communication controller, wherein each of the communication data of the bidirectional communication has a data structure having a first band and a second band, the second band contains data indicating identification information with which a destination communication controller can be identified, and the first band contains data to be used by a destination device, the cable has a first power line to which a power supply voltage to be supplied to the plurality of devices is applied, a second power line to which a ground potential is applied, a signal line for use to transmit the data, and a control line for use to transmit a clock signal, the second power line is arranged to cover a periphery of a line group including the first power line, the signal line, and the control line, and the second power line is a shield line entirely covering the periphery of the line group.

* * * * *